United States Patent [19]

Yarnell

[11] Patent Number: 5,322,793
[45] Date of Patent: Jun. 21, 1994

[54] COMPOSTING BIN

[75] Inventor: Richard Yarnell, Portland, Oreg.

[73] Assignee: Shambles Workshops, Portland, Oreg.

[21] Appl. No.: 800,047

[22] Filed: Nov. 29, 1991

[51] Int. Cl.⁵ ............................................... C12M 1/04
[52] U.S. Cl. ................................... 435/313; 435/287; 71/9
[58] Field of Search .............. 71/9; 422/184; 435/287, 435/313

[56] References Cited

U.S. PATENT DOCUMENTS

| | | | |
|---|---|---|---|
| 3,654,903 | 4/1972 | Montgomery | 119/15 |
| 3,856,276 | 12/1974 | Pannell | 259/183 |
| 3,951,294 | 4/1976 | Wilson | 220/5 R |
| 4,105,412 | 8/1978 | Petzinger | 23/259.1 |
| 4,125,394 | 11/1978 | Wilson | 71/9 |
| 4,184,602 | 1/1980 | Moliard | 220/4 C |
| 4,211,033 | 7/1980 | Ringer | 47/45 |
| 4,343,907 | 8/1982 | Graefe | 71/9 |
| 4,352,888 | 10/1982 | Tisbo et al. | 435/287 |
| 4,683,674 | 8/1987 | Faul | 47/83 |
| 5,190,572 | 3/1993 | Long | 71/9 |

FOREIGN PATENT DOCUMENTS

3736889 6/1988 Fed. Rep. of Germany ............ 71/9

OTHER PUBLICATIONS

Nardozzi, Charlie, Composters Compared. *National Gardening*, Sep./Oct. 1991, pp. 38, 39, and 69. (no date).
Anonymous. Portable Wood & Wire Composting Bin. Pierce County [Washington] Solid Waste Division and Pierce County Master Gardeners.
Smith & Hawken, Summer 93 Catalogoe, 1993, pp. 18–19.
1993 Catalog of Nichols Garden Nursery, Albany Oregon, p. 55, YardMaster Stacking Compost Bin.
Product brochure for YardMaster Composting Bin, Southern Case, Inc., Raleigh, N.C. (No date).

*Primary Examiner*—Ferris Lander
*Attorney, Agent, or Firm*—Keith D. Gehr

[57] ABSTRACT

A composting bin is disclosed that is readily assembled from modular panels. The bin is made in superposed sections, each section being formed from ventilated sidewall modules assembled into a regular polygon, usually a square. A latching arrangement is provided at the ends of each sidewall module to unite it to adjoining modules. The sidewall modules have a double wall. An outer wall provides structural support and is preferably formed of spaced apart slats firmly mounted on a frame. The inner wall is formed from screening. Free air circulation is achieved through the spaces between the slats and screening into the interior of the bin. The sections are readily stripped from composting material held within the bin to allow ready access from the sides for removal or mixing.

11 Claims, 3 Drawing Sheets

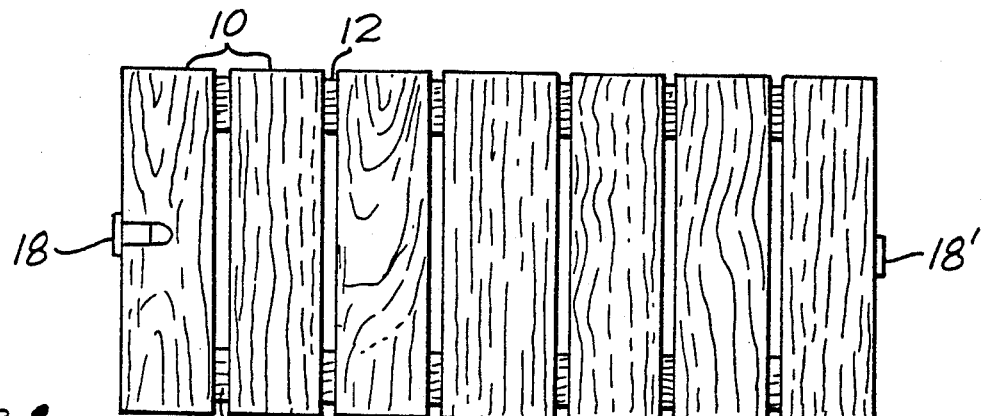
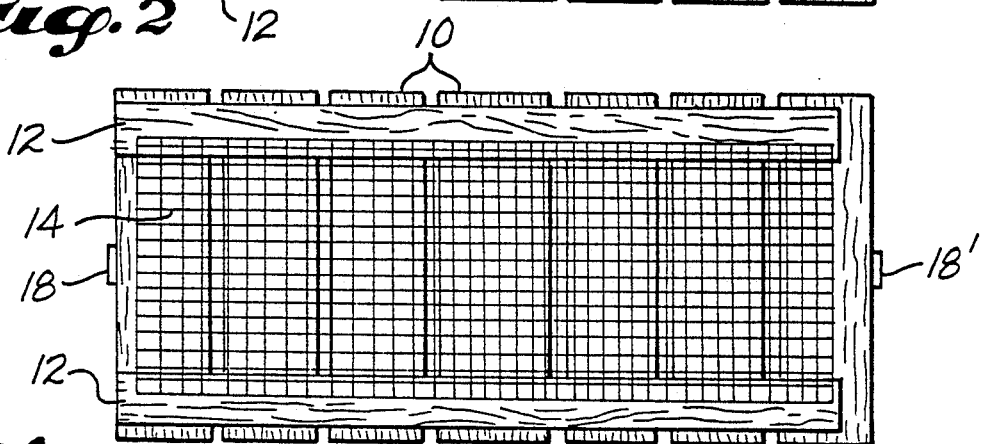
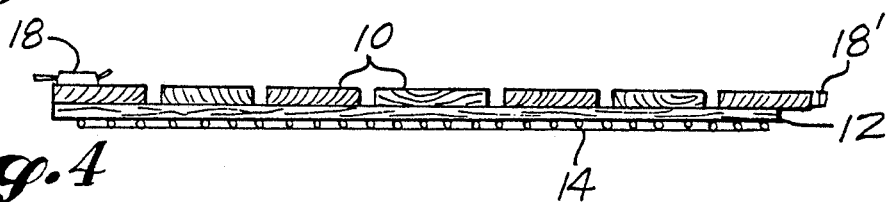
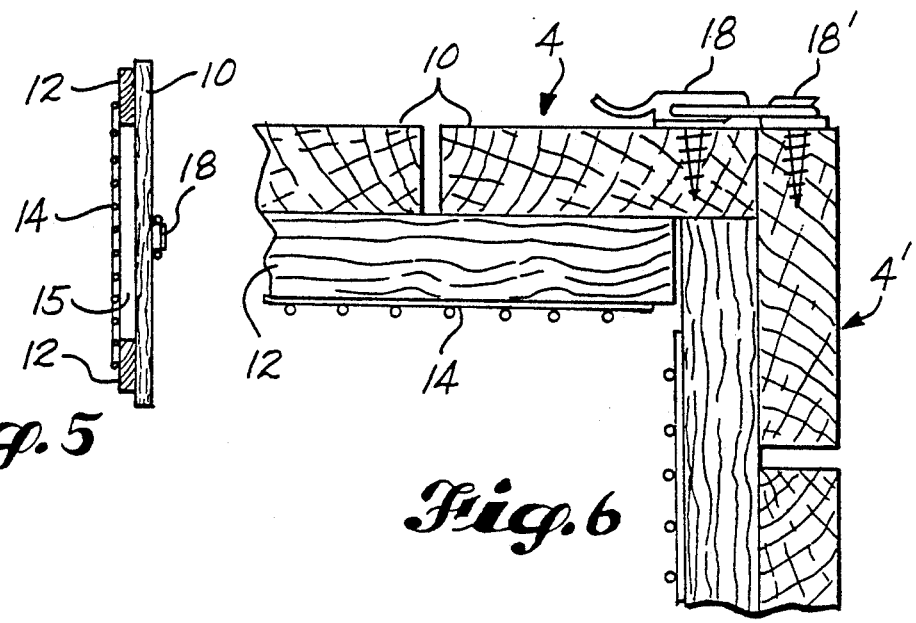

COMPOSTING BIN

BACKGROUND OF THE INVENTION

The present invention relates to a bin for composting vegetable matter such as lawn and garden waste and to the method of its use. More specifically, the bin is of a type that can be readily assembled from modular parts and equally readily disassembled to permit quick and ready access to the contained composting material.

Composting lawn and garden waste serves a dual purpose for the home resident. It provides a way to dispose of bulky waste such as lawn clippings, hedge trimmings, vegetable-type kitchen scraps, etc. Further, the resulting compost is a valuable soil amendment. It adds organic matter to the soil without imposing significant nitrogen or other nutrient demand. This is particularly important in sandy or clayey soils. The addition of compost improves tilth in heavy clay soils and water holding capacity in sandy soils. The organic portion of the soil also plays a critical function in ion exchange between mineral nutrients in the soil and plant root structures.

Compost formation is caused by bacterial and fungal action, especially on the cellulosic and other carbohydrate portions of the plant residues. It can proceed under either moist aerobic or anaerobic conditions, although the former is much to be preferred. Thermophilic and other aerobes are particularly efficient at reducing plant wastes to a rich humus. Aerobic decomposition generally proceeds much faster and is essentially without odor. Depending on a number of factors, plant wastes can be composted under highly aerobic conditions in periods ranging from a few weeks to several months. This same process with similar vegetal matter can take years under anaerobic conditions. Aerobic composting results in emission of water and carbon dioxide with considerable heat being produced. Temperatures in actively composting plant wastes can rise to levels in the neighborhood of 65° C. (150° F.) or even higher. Some of the composting microflora are adapted to thrive and multiply under these elevated temperatures. The higher temperatures are very desirable because the composting action is greatly accelerated and weed seeds and plant and soil pathogens are killed.

Since compaction occurs as a compost pile builds up and as material decomposes, aeration tends to become poorer, especially in the interior portions. In these compacted volumes the action of the obligate aerobes causing the composting slows significantly. Ultimately the aerobic microflora would be replaced by anaerobic microflora. These not only act slowly but give off methane and obnoxious gases containing reduced sulfur compounds. Serious home gardeners usually ensure good aeration by periodically turning over the composting material to restore a loose and permeable structure. This might be done several times during the composting period on a given pile of plant wastes. It is a general rule that, within reason, the more times an active compost pile is turned over the faster the process will proceed and product uniformity will be better. The serious gardener will manage the bed and determine turnover times by measurement of the internal temperature profile over time, according to known procedures. Unfortunately, for the average gardener turning over a compost pile involves relatively heavy work and considerable lifting. Normal bins are usually a rectangular wooden structure that may or may not have one open or partially open side. As the composting material is shoveled or forked out, access to the material in the bottom becomes difficult. Some existing bins are made with hinged sides so that the bin can be completely stripped from the pile to enable easier turnover. These tend to be heavy and awkward and have not found general acceptance. Other strippable bins are made of wire screening, such as poultry wire. This is prone to deformation during use and kinking upon removal. These screen bins do permit better aeration than closed-sided bins but suffer from accelerated moisture loss which slows composting.

Commercial composting operations have long been in operation to produce growing medium for crops such as mushrooms. These formerly used large quantities of animal manures. More recently they have used other agricultural wastes such as corn cobs and stalks, surplus or spoiled hay and similar plant materials, as well as sludge from bioponds. These materials are usually piled in long windows on the ground and frequently turned with large machines to ensure good aeration. A machine of this type is shown in U.S. Pat. No. 3,856,276.

Many types of home composting bins have been proposed and some are sold commercially. U.S. Pat. No. 3,654,903 describes equipment for growing earthworms and simultaneously producing a compost leachate, commonly called "compost tea". This system would seem to be poorly adapted for the gardener growing anything more extensive than house plants.

U.S. Pat. No. 3,951,294 describes a compost bin composed of interlocking modular units that slide together vertically. The sidewalls may be perforated or may be constructed from screens held in marginally located frames. These frames interlock side-to-side by sliding together vertically. They can also be built up in a one-above-the-other fashion using a pin and socket locking arrangement. A related divisional patent, U.S. Pat. No. 4,125,394, shows one version that apparently has a snap-on lid.

U.S. Pat. No. 4,105,412 describes a composter which again is primarily adapted for making a compost tea or "sap". The composting plant material is held within a perforated corrugated structure which is surrounded by an imperforate shell similar to a bottomless garbage can. A tight lid covers the device. Water is periodically poured through the composting plant waste and the "sap" is collected in a pail underlying the upper portion of the structure. While the preferred embodiment would be essentially anaerobic, one version shows a structure of simple spaced apart horizontal wood slats resting on the bottom pail. One of the bottom slats may be omitted to permit "mining" the compost after it is formed.

U.S. Pat. No. 4,184,602 shows a modular multipanel system useful for storage of grain or other materials and also useful for composting bins. Two identical panels are hinged along their edges. The panels have regularly spaced notches along their upper and lower transverse edges. These notches serve to accommodate clips that can combine the panel modules into various configurations.

A simple enclosure of wire screen panels is shown in U.S. Pat. No. 4,211,033. The panels are relatively rigid and self supporting and can be formed into enclosures of various shapes and sizes.

U.S. Pat. No. 4,352,888 describes another modular composting bin made of molded plastic panels. These are joined end-to-end by vertically sliding together a molded rod and hook arrangement. Slots are provided in the sidewalls to provide limited aeration. Telescoping flanges on the top and bottom of the panels provide a snap together arrangement for increasing the height of the bin. There is no ready provision for removing compost except from the top.

U.S. Pat. No. 4,683,674 shows a composting bin of modular molded plastic units similar in many ways to the one just described. Provision is made here for doors on the sides of the panels. These ostensibly permit removal of compost from any level although, depending on the size of the bin, this would be difficult using any tool larger than a garden trowel. The doors seem better adapted for use of the bin as a vertical planter. One figure shows an entire lower panel absent for compost removal from the bottom. How this panel would be removed, in view of the interlocking construction, is not described.

A simple wood frame supported screen wire enclosure that can be readily opened to give access to the composting material is described in a Pierce County (Washington) Master Gardeners Bulletin. In principle this is similar to the enclosure of U.S. Pat. No. 4,211,033. While simple wire containers of this type can ultimately produce compost, the exterior portion of the pile is exposed to ambient air and wind which results in rapid heat and moisture loss from the surface. This can be sufficient to slow or almost stop aerobic composting action. On the other hand, bins made of wood, plastic, or metal frequently inhibit access by fresh air to much of the surface of the composting mass. This can result in an anaerobic environment within the stack of material.

A number of commercially available or home made composters use a tumbling or rotary action to speed the composting process. Several of these are compared with stationary composters in an article by Charles Nardozzi, *National Gardening*, Sep./Oct. 1991, pp 38,39, and 65. Most of these are small and of very limited capacity.

While all of these prior known composting bins would have greater or lesser usefulness, none of them fully address the problem of simplifying the turnover of substantial amounts of the contained composting plant material to achieve rapid aerobic composting. The present invention is particularly well adapted for dealing with the problem of compost turnover and for making compost very rapidly and efficiently with considerably reduced manual effort.

SUMMARY OF THE INVENTION

The present invention relates to a composting bin and the method of its use. The bin is of simple modular construction and is readily assembled and disassembled without the use of tools. It is particularly well adapted to be stripped level-by-level from a contained stack of plant material to enable rapid and easy removal or turnover of the contained composting plant wastes.

The bin itself is composed of a plurality of sections stacked or superposed vertically one upon the other. Normally the height of the sections will be chosen so that a stack of three sections will be optimum. However, a greater or lesser number might be chosen for particular situations. Each of the sections is assembled from a plurality of individual sidewall modules. These are assembled end-to-end into the form of a regular polygon. Most typically the configuration chosen will be for a square bin but other geometries, such as hexagonal, may also be selected.

Each of the sidewall modules is of double layer construction. The outer wall layer will be rigid for structural support. It is preferably composed of either vertically or horizontally spaced apart slats rigidly mounted on a frame. While wood is a preferred material of construction, other materials, such as molded or extruded plastics, are also suitable. The outer wall may also be made from solid panels, such as plywood, as long as sufficient ventilating apertures are provided. In addition to providing structural support, the outer wall provides sun and wind protection to prevent the composting material from excessive drying. The inner layer will be an open mesh screen. This may be made of woven or welded wire or plastic screening. Perforated sheet metal or plastics are equally suitable and should be considered fully equivalent to screening and to be encompassed by that term. While this is not critical, it is much to be preferred that the screening should have at least 50% open area. The inner wall layer is made of screening and is spaced apart from the outer wall sufficiently so that good air circulation occurs between the walls and through the screening material. The slats in the outer wall layer should be spaced apart sufficiently so that air is readily admitted between them.

Each sidewall module will have an external latching mechanism, located at each end, for joining the adjacent modules together. Many types of latches are suitable. One that has proven excellent is the simple loop and hook lever latch of the type used on luggage and carrying cases. Similar latches may be used on the longitudinal or transverse edges of the modules for joining the superposed sections in proper geometric and mechanical alignment.

Latches on the longitudinal edges are only one of a number of possible forms of vertical alignment mechanism for the bin. Another is the use of bars which are vertically oriented; i.e., normal to the transverse edges of the modules. These are fixed to either the outer or inner walls of the modules and extend beyond one or both of the edges to engage the adjacent upper or lower module or modules. Normally a single vertical bar on each module will be sufficient for alignment although more may be used if desired.

In use, the modules are assembled into sections and the sections are stacked to the desired height to form the completed bin. The bin may be placed either on the ground surface or on a prepared basal platform. It may also be slightly elevated on corner blocks. Plant waste to be composted is accumulated until the bin is approximately full. The newly added material may be inoculated, if desired, with old compost to expedite microbiological action. After a sufficient period of time for composting to have commenced the bed may be turned over to ensure good porosity and aeration and to accelerate the action. This is most conveniently done as follows. The uppermost section of the bin is disassembled so that it can be easily stripped off of the column of partially composted matter within the bin. This section is reassembled on the ground beside the original bin and becomes the lowest section of a new bin. Material from the top is then shoveled and pushed from the column of partially composted plant waste into the reassembled bin section. Then the middle section is stripped from the remaining original compost column and reassembled on top of the first removed section. Access to this compost column is from the sides as well as the top. Again, the compost from the middle portion of the first bin is shoveled into the new bin. The required lifting distance is almost negligible, being no more than the height of one section. Finally, the process is repeated for the last section of the original bin. In essence the column of partially composted material has been turned upside down but with considerable mixing and loosening also occurring.

One version of the composter will include a lid or cover coextensive with and covering the upper section. A preferred cover is made in two parts. The lower portion of this cover is comprised of a peripheral frame supporting a screen in the interior area. A second part is a solid panel which covers the screen. When the bin is stripped down the lower portion of the cover may be placed on a reassembled section for screening finished compost. The cover protects against excessive drying from sun and ambient air movement as well as excluding pests.

It is an object of the present invention to provide a composting bin that is readily assembled and disassembled.

It is another object to provide a composting bin that allows excellent aeration of the contained composting plant wastes while still reducing moisture loss through evaporation.

It is a further object to provide a composting bin that allows easy turn over of the contained materials in order to promote rapid composting.

It is also an object to provide a composting bin that is compact and attractive and does not detract from the appearance of a well kept urban lot.

It is yet an object to provide an essentially odor free method that can very rapidly form composted plant material.

These and many other objects will become readily apparent upon reading the following detailed description taken in conjunction with the drawings.

BRIEF DESCRIPTION OF THE DRAWINGS

FIGS. 2 and 3 are respectively front and rear elevations of a single sidewall module of the bin.

FIG. 4 is a plan view of an upper or lower edge of a sidewall module.

FIG. 5 is an end elevation of a sidewall module.

FIG. 6 is a fragmentary plan view showing a corner junction of two sidewall modules.

DESCRIPTION OF THE PREFERRED EMBODIMENTS

The present composting bin is advantageous from a number of standpoints. It can be made large enough to hold a critical mass of composting plant wastes yet is efficient in the use of space. It reduces the labor required for turning over and mixing significant amounts of composting material. Further it may optionally have a lid or cover that protects the contents and can serve as a convenient screen for removing uncomposted sticks and similar material from otherwise finished compost.

There are several requirements for rapidly and efficiently producing compost. The mass of plant waste must be large enough so that there is not significant heat loss, especially from the interior portions. In general this requires a volume of at least about 1 $m^3$ on a base of about 1 $m^2$. Adequate moisture must be present and provisions must be made either to prevent moisture loss or to periodically add water. The composting mass must be sufficiently loose or porous to permit entry of air into the interior but airflow should not be so great as to cause excessive drying or cooling. Finally, a healthy colony of suitable aerobic bacteria and fungi must be present. These will be present naturally on much of the plant waste added to the bin but the action can be accelerated by seeding newly added material with previously formed compost.

Figure 1:
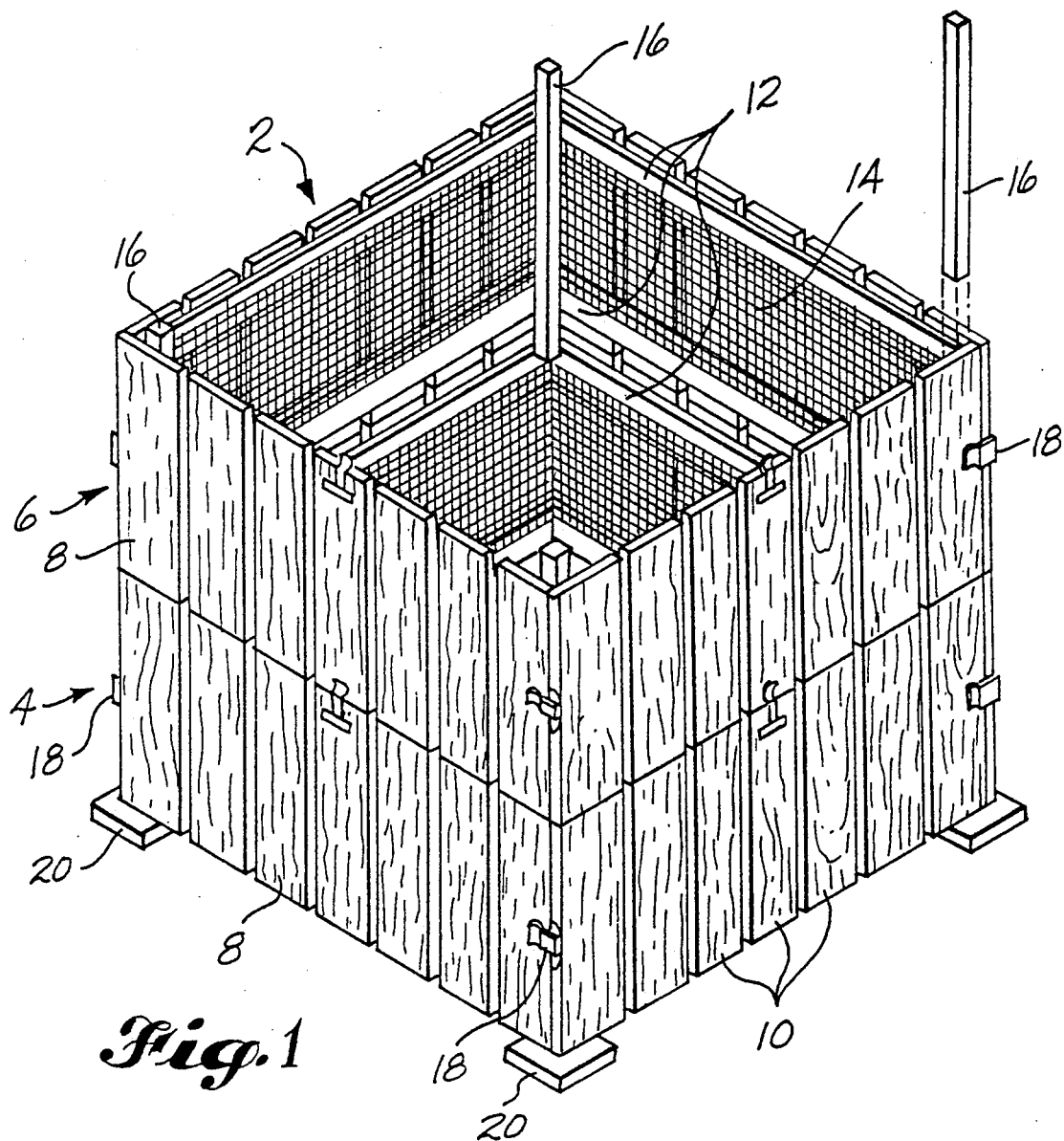
FIG. 1 is a perspective view of a partially assembled composting bin.

Reference should now be made to the drawings where construction of a preferred embodiment of the bin will be described. FIG. 1 is a perspective view, taken from above, of two sections of a partially assembled composting bin. Normally there would be a third or even more sections stacked on top of these, although this is not absolutely essential. The bin, generally shown at 2, comprises a lower section 4 and a superposed section 6. Each section is composed of four identical sidewall modules 8 joined at their ends by latches 18, 18'. An alignment bar 16 is placed at one end of each module comprising section 6 to hold it in vertical and horizontal register with lower section 4 and any upper sections 7 that might be added. These bars may be located at any position on the module and more than one may be used if desired. Latches similar to those uniting the ends of the sidewall modules, or a pin and socket arrangement, may be used in place of the alignment bars for vertical assembly.

The bin may rest directly on the ground or another surface. It is sometimes preferable to support the corners on concrete blocks, bricks, etc. 20 so that the lowest section in not in contact with soil.

Construction of the individual sidewall modules is best seen in FIGS. 2–5. One preferred construction uses spaced apart vertical wooden slats 10 fastened to transverse frame members 12 by screws, nails, staples, or other means. These form the outside of the sidewall module and provide structural rigidity and integrity. The spacing should be sufficient to provide free flow of air between the slats. Materials other than wood; e.g., molded or extruded plastics, may be used for the outside portion of the sidewall modules. Alternatively, they may be constructed using a panel, such as plywood or water resistant flakeboard which is provided with sufficient apertures for ventilation. Normally the open area of the sidewalls should be at least about 10% of the total area.

A screen 14, of metal or plastic, is mounted on the opposite side of frame members 12. This is spaced apart from the outside slats to leave an air space 15 and forms the interior surface of the sidewall modules which will be in contact with the composting plant material. The screen allows good air circulation into the mass of composting material and should have at least about 50% open area for best results. Screen 14 should be spaced at least about 1 cm from the material forming the outside wall to allow unrestricted air circulation. Construction of the type described permits good air circulation around and into the composting plant material but prevents excessive moisture loss due to the action of sun and wind.

While dimensions of the sidewall modules are not critical, a length of about 1 m and height of about 40 cm for each sidewall module has proved convenient. When stacked three high, a bin of these minimum dimensions provides sufficient volume to reduce heat loss and provide and maintain a favorable thermal and moisture environment for the composting microorganisms.

As seen best in FIG. 6, each end of every sidewall module is provided with a latching arrangement for attaching the module to the adjoining modules in any given section. These latches may be of many different types including sliding bolts, hooks and eyes, etc. One that has proved very useful is a trunk-type latch employing a loop and tightening lever 18 which engages a corresponding hook member 18'.

Figure 7:
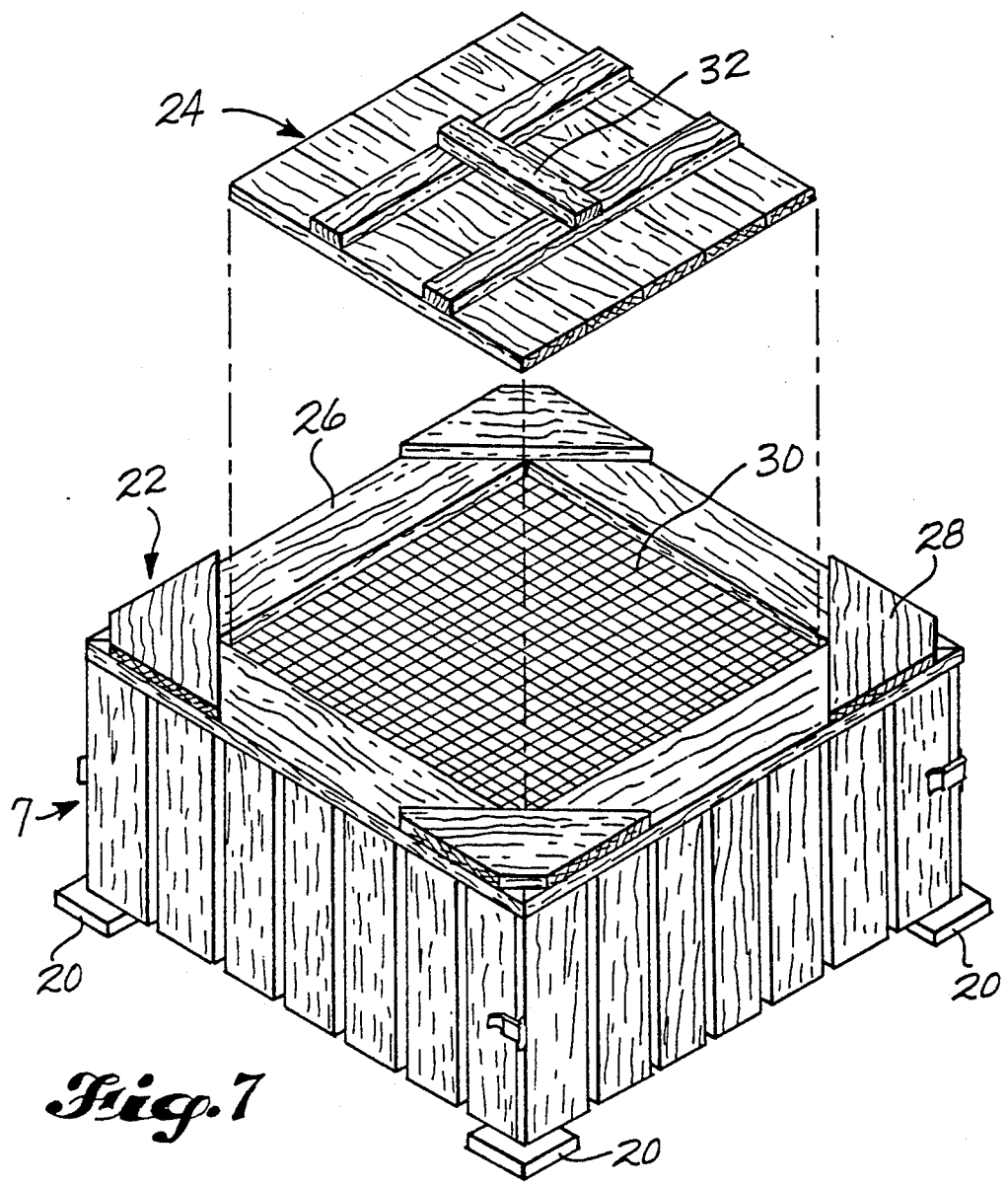
FIG. 7 is a perspective view of a lid assembly for the bin.

While not absolutely essential to the construction and operation, a cover or lid forms a very useful complement to the composting bin. One such cover, designed to serve a dual purpose, is shown in FIG. 7 where it is shown in place on a single bin section 7. The cover can serve to retain moisture in the composting mass by preventing drying from the action of sun and wind. Further, it helps to maintain an optimum moisture level by excluding rain. It also helps to keep out small animals and other pests that might be attracted; e.g., to kitchen scraps. The cover shown consists of a lower portion 22 and upper portion 24. The purpose of this two piece construction will be described but it is evident that any form of cover, such as a plywood panel, would also be suitable.

In the preferred version of cover, lower cover portion 22 consists of four wooden members 26 joined together into a square frame reinforced by corner gussets 28. A screen member 30 is attached to the underside of the frame. The upper cover portion 24 is sized to fit closely within the confines of the frame formed by members 26 and may rest upon the screen 30. Alternatively it may be made somewhat larger; e.g., with flanged edges, so that it rests on the interior edges of the frame describing lower portion 22.

Still referring to the arrangement shown in FIG. 7, it will be apparent that the lower cover portion 22 can serve to screen the finished compost to remove any uncomposted material such as twigs or branches that do not readily decompose. In this case the cover is placed over an empty bin section 7 which receives the screened compost. While this would ordinarily be the uppermost section removed from an assembled bin, other forms of support for the lower cover portion 22 that give sufficient ground clearance would be equally suitable when it is used for screening.

Figure 8:
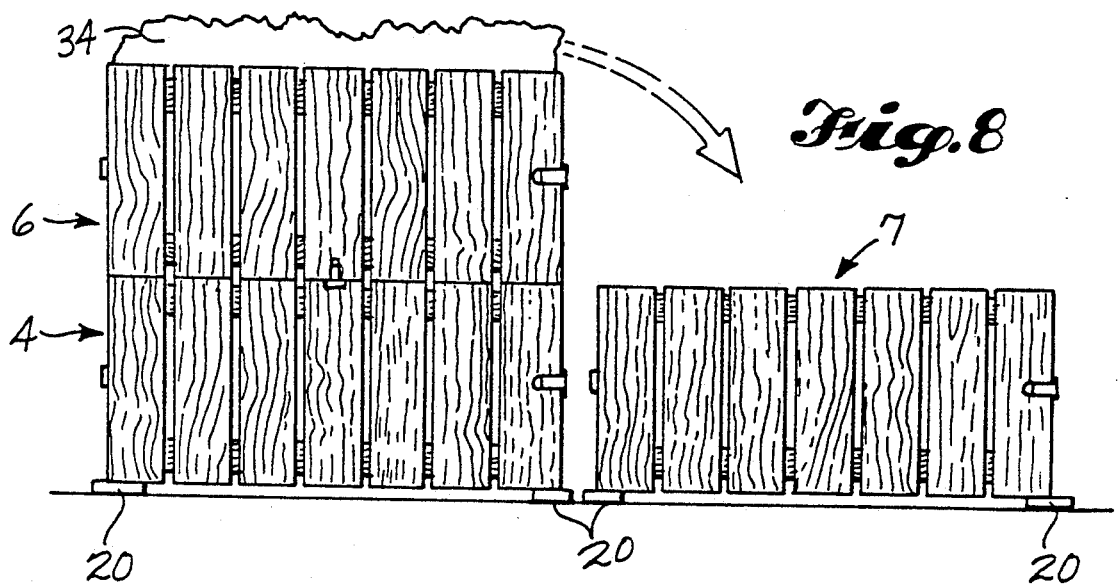
FIG. 8 shows a bin partially disassembled and arranged for compost turnover.

FIG. 8 shows how the present composting bin is advantageously used for preparing compost on an accelerated schedule. Normally a bin of three stacked sections will be filled with plant material which is allowed to compost for a period of time. The particular usefulness of the modular construction of the individual sections becomes readily apparent at this time. It would be very difficult, even for two people, to lift off a unitary section from the top of a compost filled bin. This is because the composting plant material tends to lock into the openings of the screen 14 forming the inner wall of the sections. By simply releasing the latches 18 at the ends of each sidewall module, the sections may be readily stripped away from the contained compost. At any desired interval the upper section 7 is disassembled from the bin and reassembled adjacent to it. A column of compost 34 then remains standing above the middle section 6. The portion upstanding above section 6 is easily shoveled or pushed into the now empty section 7 where it is loosened and mixed. Next the sidewall modules of middle section 6 are stripped off and reassembled atop section 7. Again, the compost is shoveled from the original column into the newly emptied section 6. Finally, the original bottom section 4 is stripped and reassembled as a new top section. The compost located therein is shoveled onto the top of the newly turned over and mixed pile in the reassembled bin. Lifting during shoveling is greatly reduced by this procedure. It is a further convenience that it is not necessary to try to shovel compost out of a bin with inconveniently high walls.

During composting the volume of material is significantly reduced, often to about ⅓ of that originally present. The present construction thus enables one or more sections to be removed as composting proceeds. These can be reassembled into another bin and used to accept new material so that it need not be added to essentially finished compost.

When placed in a simple pile it can take anywhere from 6 to 24 months for plant material to decompose to the point that it can be used as a soil additive. Using the present composting bin, a mixture of lawn clippings, wood shavings, and garden weeds was converted into ready-to-use compost in only three weeks. The newly added material was initially inoculated with finished compost and then turned over three times during composting. Internal temperatures as high as 65° C. indicated vigorous action of the aerobic microflora.

The modular construction of the present bin is advantageous in that it enables very compact packaging for sale and storage.

While the description just given is of the best mode presently known of making and using the composting bin, it is readily apparent that many variations not shown or described could be made without departing from the spirit of the invention. Thus, the invention should be regarded as limited only as it is described by the following claims.

I claim:

1. An aerobic composting bin which comprises:
   a plurality of vertically superposed sections, one section being uppermost, each section further comprising a plurality of individual separable sidewall modules, said sidewall modules being combined end-to-end into the configuration of a regular polygon to form one of said sections,
   each sidewall module having a ventilated outer wall providing structural support and a spaced apart foraminous inner wall so as to allow free gas interchange between the atmosphere and the interior of the bin, said outer wall having at least about 10% open area, said inner wall having at least about 50% open area, and said spacing being sufficient to allow unrestricted air circulation between said inner and outer walls,
   each sidewall module having external latching means to permit ready assembly and disassembly to and from its adjoining sidewall modules, said latching means allowing each module of the then uppermost section to be easily and individually stripped away from the bin even when the bin is filled with compost, whereby the sections of the bin may be readily disassembled and removed to permit easy access to composting plant waste material contained within the bin.

2. The composting bin of claim 1 in which the ventilated outer wall of the sidewall modules comprises a frame with a plurality of spaced apart slats.

3. The composting bin of claim 2 in which the foraminous inner wall of the sidewall modules comprises an open mesh screen spaced inwardly from the slats.

4. The composting bin of claim 1 in which the foraminous inner wall of the sidewall modules comprises an open mesh screen.

5. The composting bin of claim 1 which further comprises alignment means to maintain the superposed sections in geometric alignment.

6. The composting bin of claim 5 in which the alignment means comprises a bar mounted on at least a portion of the sidewall modules, said modules having transverse edges and said bar being oriented normal to and extending beyond at least one of said transverse edges so as to engage and align an adjoining section.

7. The composting bin of claim 6 in which at least one of said bars is located on each sidewall module of a given section.

8. The composting bin of claim 5 in which the alignment means is present only on alternate sections and comprises a bar mounted on the sidewall modules, said modules having transverse edges and said bar being oriented normal to and extending beyond each of said transverse edges so as to engage and align adjoining sections located above and below said alternate sections.

9. The composting bin of claim 8 in which at least one of said bars is located on each sidewall module of said alternate sections.

10. The composting bin of claim 5 in which the sidewall modules have transverse margins and the alignment means comprises at least one external latching means located adjacent each sidewall transverse margin, said latching means engaging any adjacent higher or lower section.

11. The composting bin of claim 1 further in combination with a removable cover, said cover being coextensive with and overlying the uppermost bin section, the cover comprising a lower portion containing a screen held within a peripheral frame and a removable upper portion providing a cover for the screen.

* * * * *